United States Patent Office 3,062,664
Patented Nov. 6, 1962

3,062,664
BOILABLE AND EDIBLE FOOD PACKAGING
William Pollock, 1184 Evergreen Ave., Bronx 72, N.Y.
No Drawing. Filed Nov. 8, 1960, Ser. No. 67,933
1 Claim. (Cl. 99—171)

The invention relates to a packaging material which is resistant to boiling water and which, itself, is edible. The packaging, therefore, is suited for containing foodstuff but is not limited thereto and can be used for other materials to be protected from their surroundings.

Boilable food bags on the market to date usually are made from laminated films whose layers consist of a polyester, of polyethylene or of polypropylene.

It now has been found that a boilable and edible food-bag can be manufactured from wheat gluten, a natural and edible raw material which is abundantly available. Wheat gluten is a protein present in wheat and has been known for approximately 100 years as a rubbery wet mass after its extraction from wheat flour. Its rubbery properties link this material to the plastics. However, its employment as an edible container has been unknown for two principal reasons, i.e., biochemical instability and difficulties in shaping. Wheat gluten normally decomposes within 24 hours at room temperature and also has a low tensile strength.

These drawbacks are overcome by the process according to the invention, since unexpectedly it has been found that wheat gluten, after a sheet has been formed thereof, can be blow-molded like a synthetic plastic and thereby yields a container which may be filled with liquid, semi-liquid or solid food or other materials. The container, for instance, may be shaped like a round or oval bottle. After the food or other contents have been entered in this container, it can be heat-sealed by pressing a sheet of the same material over the opening.

The container thus made would have insufficient tensile strength and stability, were it not for the step according to the invention, whereby the container, after forming, is immersed in a sugar-salt solution which imparts a strengthening and preserving effect to the wheat protein. After that treatment, the container has sufficient tensile strength to house foods and other items, even though its wall thickness is very slight, and it is stable at room temperature for at least 24 hours. The incorporation in the wheat gluten of commonly used preservatives, such as ascorbic acid or sodium benzoate, in the amounts customarily used for the purpose, i.e., $\frac{1}{20}$ to $\frac{1}{10}$ percent by weight, further lengthens the stability at room temperature to at least twice the time, i.e., 48 hours or more. Since the stability depends to a large extent on the biochemical action of the contents, sterilization of these contents also substantially increases the stability of the container. At the temperatures commonly prevailing in a household refrigerator, i.e., at 30–40° F., the wheat protein container is stable, without additives, for one to two weeks, and in a freezer, i.e., at 15–20° F. or less, stability prevails for practically an unlimited time.

The manufacturing procedure takes advantage of the unique properties of the wheat gluten which are its ability to expand under the influence of heat in its swollen state, containing 60–70 parts water to 30–40 parts gluten, and its initial tack which causes immediate fusion upon contact pressure. Elaborate production devices and tedious procedures thus are eliminated and economical manufacture assured.

Since it is well known that wheat flours are classified into "hard" and "soft" flours, and since their properties vary from each other, it has been found that a blend of hard and soft flours should be used in order to obtain the most satisfactory material. The gluten extracted from the flour blend is formed into a sheet of $\frac{1}{30}$ to $\frac{1}{50}''$ thickness, the sheet formed into a tube which then is blown as described below. After blowing, the container thus produced can be transparentized by insertion in a freezer at approximately 15–20° F. for 1–4 days whereby crystallization and transparency occur.

The invention now will be further described by the following example. However, it should be understood that this is given merely by way of illustration, not of limitation, and that numerous changes may be made in the details without departing from the spirit and the scope of the invention as hereinafter claimed.

*Example*

From a hard wheat flour and from a soft wheat flour, the gluten is extracted in the conventional manner, for instance: 80 parts by weight hard wheat flour and 20 parts by weight soft wheat flour are mixed intimately. 70 parts by weight of that mixture, containing as an average 65 percent by weight starch, 12 percent protein, the balance largely being salts and water are mixed with 30 parts water to a dough for the extraction of the protein or gluten. This dough is allowed to stand at room temperature for approximately 50 minutes and then is subjected to a continuous stream of water which removes all starch and water-soluble matter by solution and entrainment. The starch and solubles can be recovered and used for their customary purposes. The water-wash is continued until the gluten, which remains as residue, is practically free from starch. The residue thus obtained is a rubbery mass consisting of 30–40 percent by weight gluten and 60–70 parts water.

It also is feasible to extract the gluten separately from the hard and the soft flour and to mix the glutens obtained in the above proportions.

From the gluten mixture obtained by either process, a sheet is formed having a thickness of approximately $\frac{1}{30}''$ to $\frac{1}{50}''$. Since a cylinder will be formed from this sheet, as will be described below, the edges of the sheet are beveled down to evenly thinned ends. This can be accomplished by shaping the cutting lines with a conical rod. In order to have substantially uniform wall thickness of the cylinder to be formed, and for fast and even fusion, the beveled edges should be approximately one-half the thickness of the remainder of the sheet.

The sheet then is laid around a metal or glass tube or rod and the beveled edges overlapped. They adhere to each other immediately. The lower end of the sheet is folded around the end of the tube or rod by pressing the edges of the sheet together so that a closed cylinder is formed. The inserted rod or tube must be longer than the gluten cylinder and extend long enough beyond the same to accommodate the jaws of a clamp or similar device for holding it in position in the ensuing oven treatment.

The assembly of rod or tube, respectively, and adhering gluten cylinder now is clamped to a suitable stand and is inserted in an oven at 300–400° F. The assembly should be in horizontal position to facilitate smooth and even shaping and is allowed to dwell in the oven for 10–14 minutes. Almost immediately after insertion in the oven, a thin skin forms on the surface of the gluten cylinder which substantially prevents the water present therein from escaping. This water now begins to vaporize thus causing an expansion of the gluten cylinder. Merely a comparatively small amount of water penetrates through the skin of the cylinder. When the temperature and time conditions given above are maintained properly, a vigorous blowing action is induced by means of the steam present, and a substantially uniform bottle-shaped container ensues.

In a special embodiment of the invention, the assembly is caused to rotate while in the oven, thereby increasing the uniformity of the wall thickness even more.

In a further embodiment, the glass or metal tube is perforated, and a gas, such as air, nitrogen or $CO_2$, is blown therethrough in a low-pressure stream, while in the oven. This shortens the dwelling time in the oven to approximately 2 minutes at 400° F.

In still another embodiment, the glass or metal tube or rod is enveloped in tissue paper before insertion into the gluten film tube. This facilitates more even distribution of the steam while blowing.

Upon removal from the oven, the bottle-like container obtained has a wall thickness ranging from approximately 0.003″ for a starting film of 1/30″ thickness to approximately 0.002″ for one of 1/50″.

The container now is immersed in a stabilizing solution for 24 hours. The aqueous solutions of a number of salts and of sugar are known to impart stabilizing properties to materials subject to biochemical and biological attack. I propose to use solutions of the following compositions, for example, not, however, limiting myself thereto:

|  |  | G. |
|---|---|---|
| (1) | Sodium chloride | 15 |
|  | Cane sugar | 25 |
|  | Water | 60 |
| (2) | Sodium benzoate | 1 |
|  | Sodium chloride | 11 |
|  | Water | 88 |
| (3) | Sodium nitrate | 1 |
|  | Sodium chloride | 10 |
|  | Water | 89 |
| (4) | Sodium salicylate | 1 |
|  | Cane sugar | 27 |
|  | Water | 72 |
| (5) | Sodium salicylate | 1 |
|  | Sodium chloride | 11 |
|  | Water | 88 |

The container may be stripped off the rod or tube before immersion, or else the rod or tube can be immersed with the container. Stripping, in any event, is easy and presents no difficulties.

The 24-hour immersion in the above-described solutions imparts increased tensile strength and biochemical stability to the container. Both these properties are boosted to a level by the treatment which enables the practical use of the container and industrial handling in mass distribution.

The container thus produced has sufficient strength and biological stability to serve as a bag for foods. It is resistant to cold and boiling water although, in the latter, it swells a little. The food bag, consisting of natural material, is edible and is ideally suited to replace potentially harmful food bags made from synthetic materials.

The container then, if desired, is subjected to a further treatment rendering it transparent so that the contents later may be inspected through the gluten skin. This is accomplished by storing the container in a freezer at 15–20° F. for 1 to 4 days.

After the food or other material has been inserted in the container, a gluten film, produced in the manner described above, is placed over the opening of the container with an overlap of approximately 1/20″. This thin film then is heated to approximately 300–400° F. for 2–3 minutes, and a tight seal thus is obtained. Heating of the film can be carried out in any conventional manner, e.g., by infra-red heating lamps or by means of an electrical heating coil. The sealed end of the container is coated with one of the above-described stabilizing solutions, preferably the one named as solution 1. This makes the sealed part as stable and strong as the main body of the container.

I claim as my invention:

A process for the manufacture of an edible and biochemically stable container, of high tensile strength and substantially resistant to cold and boiling water, from wheat gluten, which comprises intimately mixing 80 parts by weight of a hard wheat flour with 20 parts of a soft wheat flour, extracting the wheat gluten therefrom with water, thereby obtaining a rubbery mass consisting of approximately 30–40 percent by weight gluten and 60–70 percent water; forming a sheet from said rubbery mass having a thickness of approximately 1/30″ to 1/50″; beveling the edges of said sheet to substantially one-half the said thickness; wrapping said sheet around a solid rod, overlapping said beveled edges; pressing the end of said sheet around one end of said rod, the other end of said rod extending beyond the confines of the wrapped sheet; exposing said wrapped sheet, now forming a cylinder having one closed end, to a temperature of 300–400° F. for 10–14 minutes; stripping said cylinder from said rod and immersing said cylinder in a stabilizing bath at room temperature for approximately 24 hours, withdrawing said cylinder from said bath, drying said cylinder and exposing it to a temperature of 15–20° F. for 1–4 days, said stabilizing bath being an aqueous solution of compounds selected from the group consisting of sodium chloride plus cane sugar, sodium chloride plus sodium nitrate, sodium chloride plus sodium salicylate, sodium chloride plus sodium benzoate, and sodium salicylate plus cane sugar.

No references cited.